UNITED STATES PATENT OFFICE.

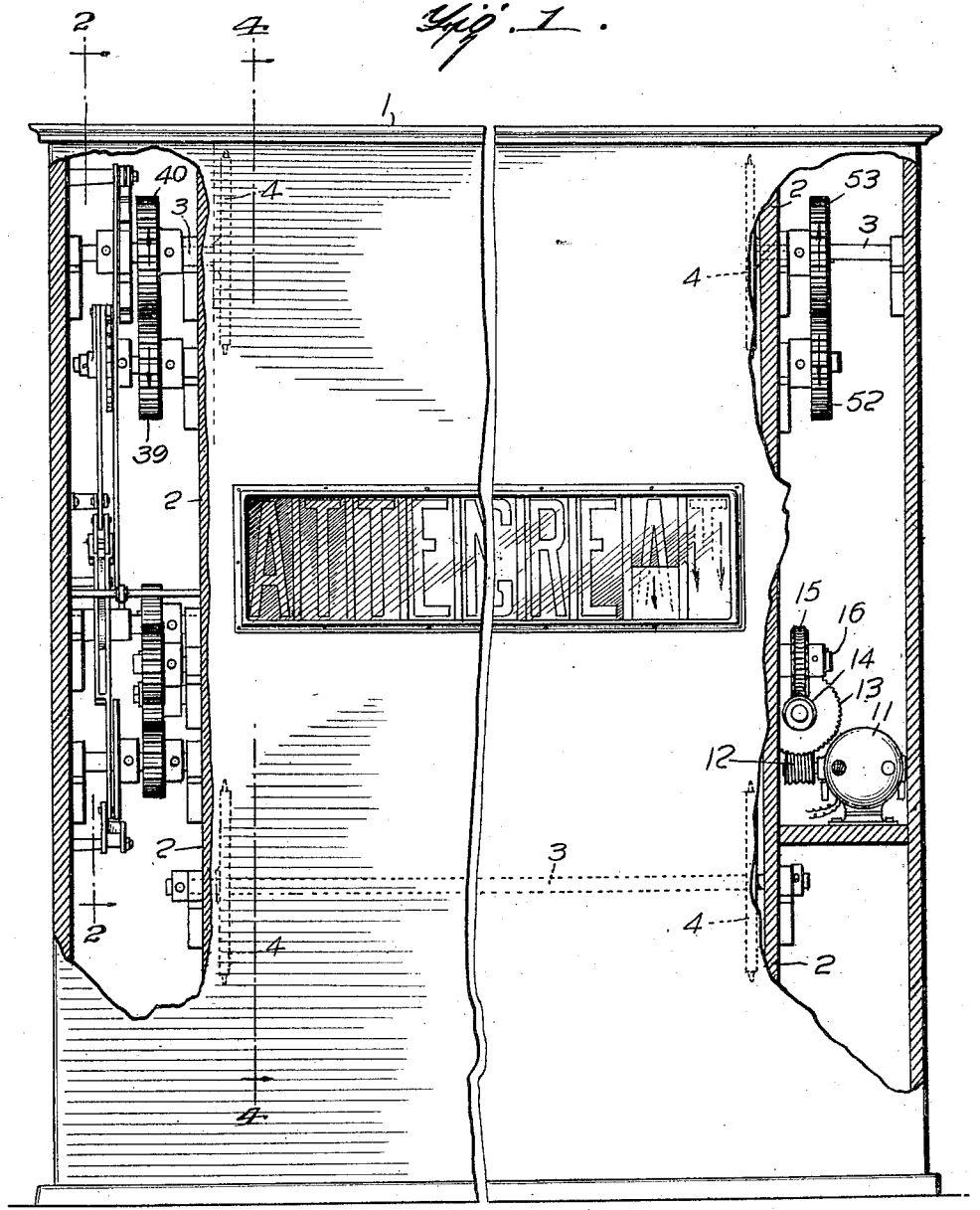

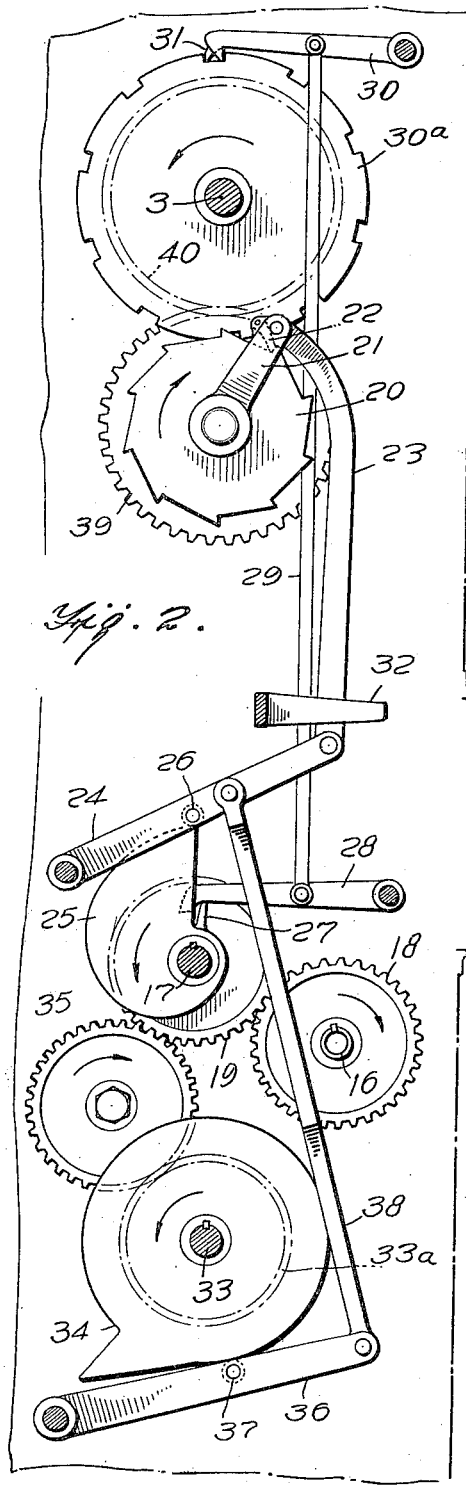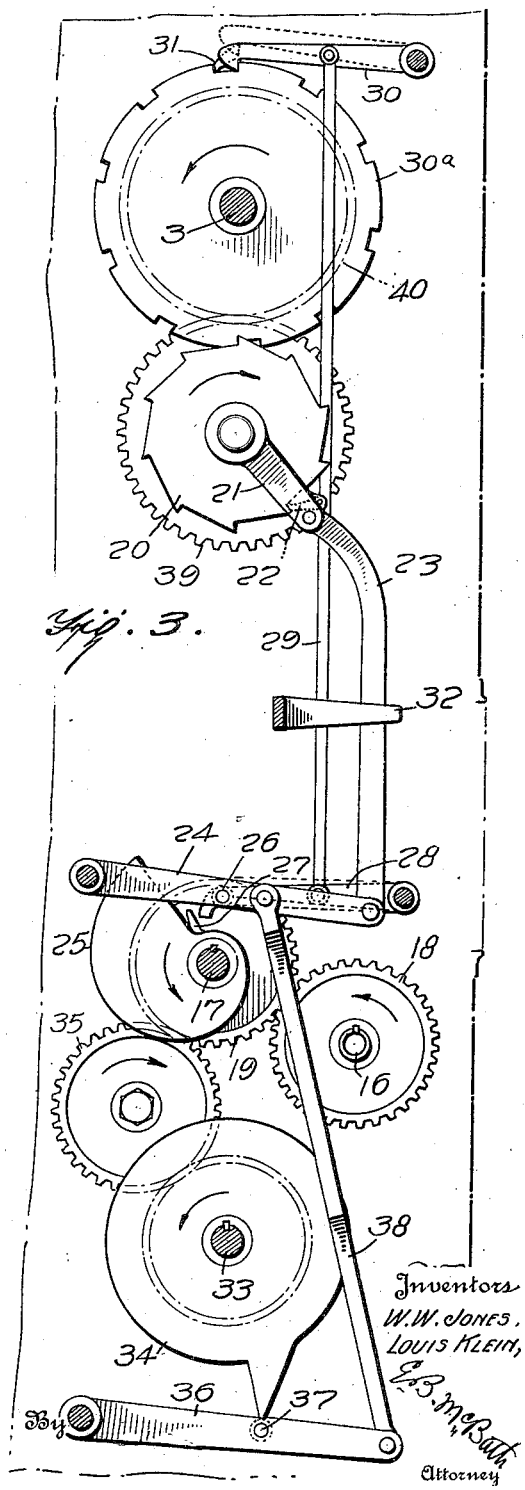

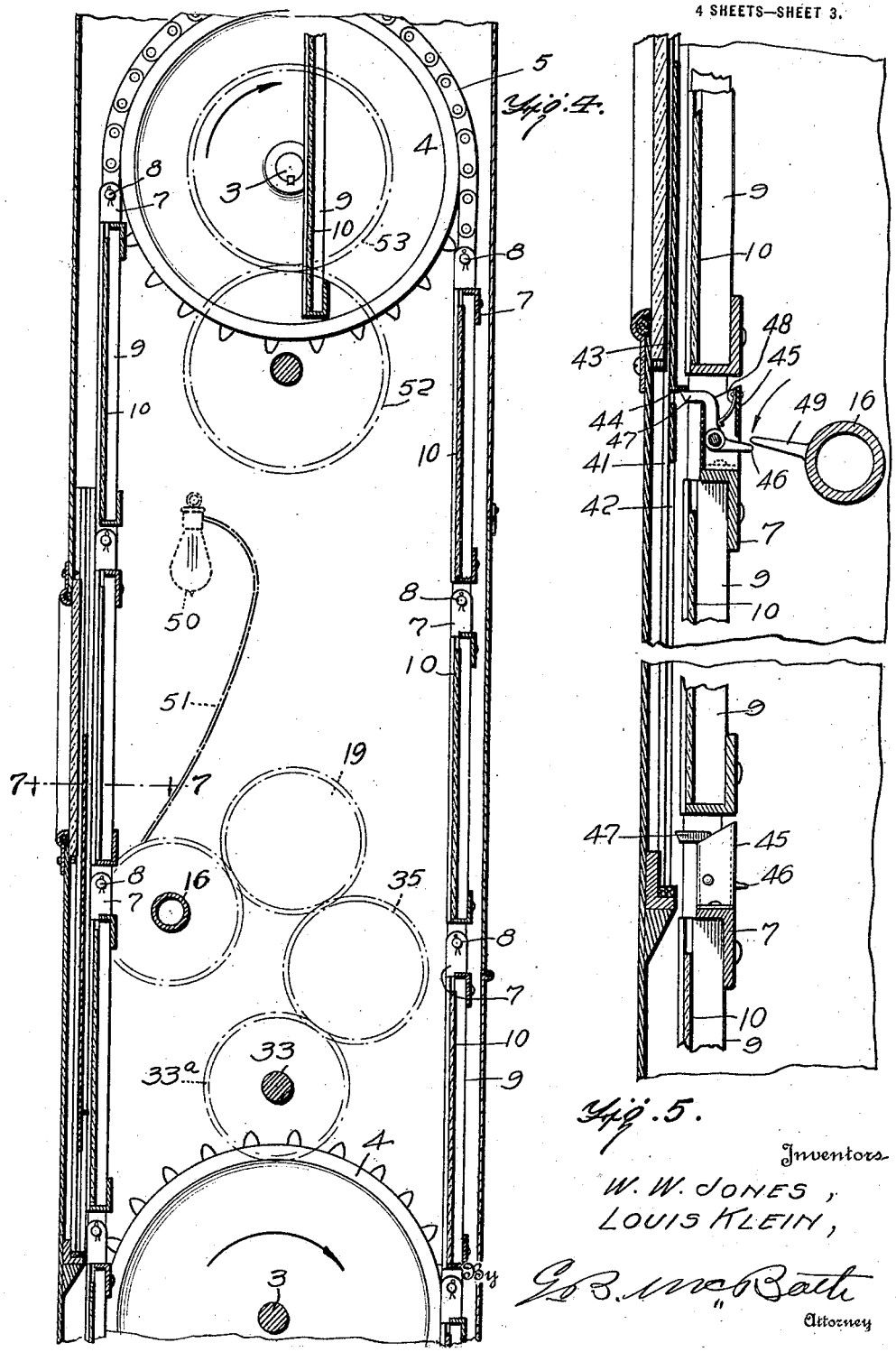

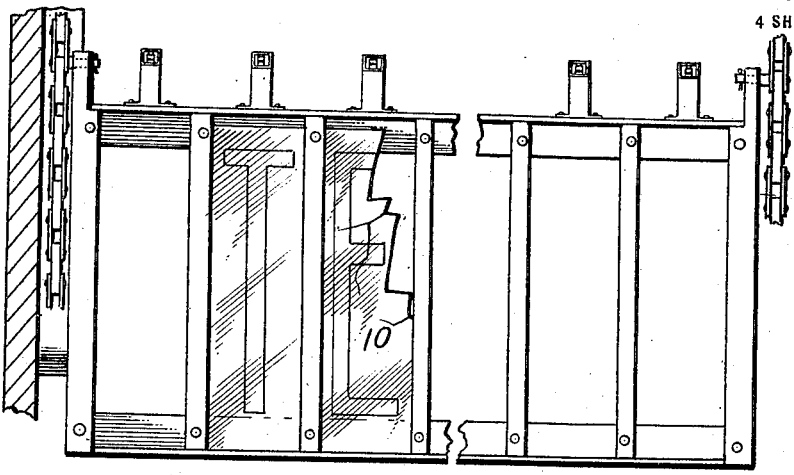
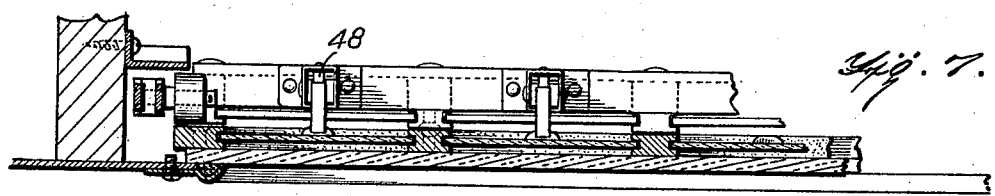
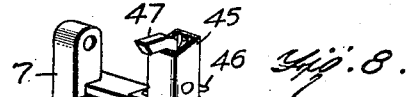
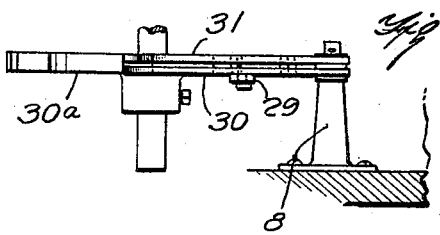
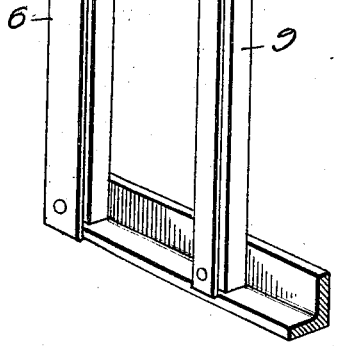
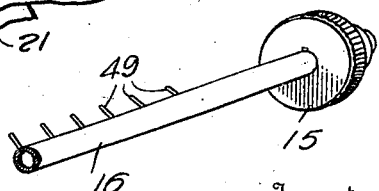

WALTER W. JONES AND LOUIS KLEIN, OF NORFOLK, VIRGINIA.

AUTOMATIC SIGN EXHIBITOR.

1,403,032.          Specification of Letters Patent.     Patented Jan. 10, 1922.

Application filed April 15, 1921. Serial No. 461,503.

*To all whom it may concern:*

Be it known that we, WALTER W. JONES and LOUIS KLEIN, citizens of the United States, and residents of Norfolk, in the county of Norfolk and the State of Virginia, have invented certain new and useful Improvements in Automatic Sign Exhibitors, of which the following is a specification.

This invention relates to a device in which a series of signs are successively brought into a predetermined horizontal plane, each sign then remaining stationary for a predetermined length of time, during which period of time the sign is gradually uncovered and exposed to view.

The invention consists in novel means for operating said sign, and in a series of shutters working successively to expose to view the individual units composing each sign, together with the means for mounting and operating the said shutters.

The invention also consists in the novel features of construction hereinafter described, pointed out in the claims, and described in the drawings, in which:—

Figure 1 is a front elevation, partly broken away.

Figure 2 is a detail end elevation of the operating mechanism.

Figure 3 is a similar view showing the parts in a different position.

Figure 4 is a section on the line 4—4 of Figure 1.

Figure 5 is a detail transverse section, parts being broken away.

Figure 6 is a detail front view of a sign casing parts being broken out, and showing the manner of connecting the casing to conveyer chains.

Figure 7 is a section on the line 7—7 of Fig. 4.

Figure 8 is a detail perspective view of a portion of the frame carrying the sign units.

Figure 9 is a detail view of a double pawl mechanism.

Figure 10 is a partial side elevation of the same.

Figure 11 is a perspective view of a drive shaft and the shutter operating pins.

In constructing the device we employ a casing 1 of any suitable size and material. As this device contains electric lights and wiring for the same it is necessary for its indoor use that the casing be fire proof. Preferably we form the casing in part of metal, lining with asbestos any wood portions. Any material however may be employed that is found suitable for the purpose.

Vertical partitions 2 divide the casing into three compartments, two narrow ones at the sides, one of which contains the motor and the other of which houses the sign operating devices, and a large central compartment in which the sign units are carried, and the casing is provided with a suitable centrally placed sight opening through which the signs may be viewed at proper intervals.

On upper and lower shafts 3 are mounted sprocket wheels 4, the upper shafts 3 extending into the central compartment and the lower shaft 3 extending entirely through it, and chains 5, Figure 4, run over said sprocket wheels. To these chains are hung a series of frames 6, each frame having at its ends a bracket 7 mounted on a pin 8 carried by the chains.

It will be understood that the chain is of the ordinary sprocket chain type. At suitable intervals the regular link pin is removed and a longer pin, as indicated at 8, is substituted for it. Each chain carries as many pins as there are frames, and the number of these is limited only by the size of the casing and of the frames. Being hung loosely from the pins by the brackets each frame will always remain in a vertical position even while the pin carrying it is passing over or under one of the sprocket wheels.

Each frame is divided by vertical, grooved partitions 9 into a number of compartments or boxes, each adapted to slidably receive a panel 10. In practice we provide for thirty of these panels for each frame, though we do not desire to be limited to any particular number. Hereafter the frames and panels carried thereby will be referred to as "signs" and the panels, as "sign units." As at present constructed we make the panels of glass partially painted, the clear portions forming individual letters. In other words each unit consists of a ground having a transparent letter thereon, and as the units are interchangeable in the frames it will be obvious that any word or words containing up to thirty letters can constitute a sign. However the units may consist in whole or in part of pictures if desired, or pictures may be interspersed with letters.

In the right hand side compartment of the casing we show a motor 11 connected by means of worms 12 and 14 and worm gears 13 and 15 with a drive shaft 16. This shaft extends through the central compartment and into both of the side compartments.

In the left hand compartment is a cam shaft 17 driven from the shaft 16 by the intermeshing gears 18 and 19. Above the cam shaft is mounted a ratchet wheel 20, having an arm 21, and pawl 22. The arm 22 has pivoted to it the upper end of an arm 23 the lower end of which is pivoted to the free end of a lever 24, pivotally mounted on the casing 1. A cam 25 fixed on the shaft 17 is adapted to engage a roller 26 carried by the lever 24 and to lift said lever at regular intervals of time thereby lifting the arms 23 and 21 and disengaging the pawl 22. A cam pin 27 carried by the cam 25 engages a lever 28, having a suitable nose, and by lifting said lever once during each rotation of the cam shaft 17, lifts a pawl 30, through the medium of a bar 29. Pawl 30 engages a ratchet wheel 30ª on the upper sprocket wheel shaft 3. An idle pawl 31 also engages said last mentioned ratchet to prevent reverse rotation of the shaft 3. A bifurcated guide bracket 32 is provided for the bar 23 to work through.

A lower cam shaft 33 carries a cam 34, the shaft 33 being driven by a gear 35 from the shaft 17, gears 18, 19 and 35 being the same size. A pivoted lever 36 has a roller 37 engaged by the cam 34, and said lever is connected by a link 38 with lever 24. In operation the cam 25 lifts the lever 24 and disengages the pawls 22, and 30. Cam 34 forces down lever 36 and through the link 38 draws down lever 24 and arm 23 and rotates the ratchet 20. This by means of gears 39 and 40 imparts a three-tenths rotation to the sprocket shaft 3 for each rotation of the cam 34.

It will be obvious therefore that the sprocket chains will be given a step by step movement moving a predetermined distance during each rotation of the cam 34, and remaining stationary the remainder of the time. It may be stated here that the gearing between the motor and the drive shaft 16 is such that said drive shaft is rotated twice each minute.

With the construction above described it will be clear that each frame carrying the sign units will be brought into view before the central sight opening and then exposed for a predetermined length of time, viz. until cam 34 completes its rotation and again rotates the ratchet wheel 20, thereby bringing a second frame and its units into view. It is not however our object to expose the sign at once, or to have any portion of it visible during the movement into reading position. We therefore provide at the front of the casing a shutter frame 41 having trackways 42, and shutters 43, each shutter being provided with a projecting lip 44. There are as many trackways and shutters as there are sign units, and each shutter operates independent of the others. Mounted on each sign frame 6 are a series of small metal casings 45, one for each sign unit which contains tripping devices, each of said devices comprising a pawl 46 and a nose 47, the nose and pawl being integral and pivotally mounted in its casing. The nose projects in the path of the shutter lips and as the sign frames 6 come into position, they thereby bring the shutters with them, so that each sign unit is hidden from view while traveling into place before the sight opening of the casing 1. A spring 48 is placed in each casing 45 to ensure proper working of the tripping devices.

The drive shaft 16 is provided with a series of spirally arranged pins extending two thirds about the shaft, and as before stated this shaft rotates about once each thirty seconds, though this time may be changed when desired. There are as many pins 49 as there are shutters and each pin is so placed that it engages one of the pawl ends of a tripping device, thereby pulling the nose from beneath the lip and permitting the shutter to drop down its track-way to the lower part of the shutter frame, which is suitably cushioned. As the pins come into operative position successively the shutters will be released one after the other and the sign units successively displayed. The entire sign will then remain in view for a brief period of time and a new frame will be brought into display position, through action of the cam 34, bringing the shutters back with it, and they will in turn be again tripped by the pins 49, and displayed, and this operation will continue as long as the motor is operated.

In practice we illuminate the sign units from the rear as by electric lights 50 and reflector 51.

To extend the shaft 3 either at top or bottom through the central portion of casing is unnecessary. At the top it would interfere with the passage of the sign frames. In the right hand compartment we place intermeshing gears 52, 53, corresponding to the ratchet gears 39, 40, the gear 53 being mounted on the upper right hand shaft 3. These act as a balance for the right hand sprocket chain 5 and tend to aid in equalizing travel of the chains.

It is thought that from the above description and the drawings the construction and use of the device, for advertising purposes, will be clear to those engaged in the manufacture and use of such devices.

What we claim is:—

1. In an advertising device, a series of signs movable step by step, and a plurality of shutters adapted to cover each sign as it moves into view position, and means for successively withdrawing said shutters.

2. In a device of the kind described, a series of signs, each sign comprising a plurality of units, means for moving the signs into view position and holding them there for a predetermined length of time, a series of shutters equal in number to the sign units, means for automatically bringing the shutters into position with each sign, and means for automatically removing said shutters successively from in front of the sign units.

3. In a device of the kind described, a frame containing a number of sign units, means for moving the frame into view position, holding it there for a predetermined length of time and then moving it out of position, a series of trackways in front of said sign, shutters adapted to travel in said tracks, means carried by the frame for engaging and lifting the shutters as the frame moves into view position, and means for releasing said shutters one at a time, said shutters when released dropping by gravity to the lower portion of the trackways.

4. An advertising device comprising sprocket chains and a drive roller, said roller having pins arranged spirally about two thirds of its circumference, means for giving a step by step movement to the chains, and a continuous rotation to the roller, frames hung from the chains, sign units carried by the frames, a series of shutters arranged in advance of the frames, tripping devices carried by the frames, means carried by the shutters adapted to be engaged by said devices thereby lifting the shutters as the frames move into view position, trackways for said shutters, the roller pins engaging said tripping devices in succession releasing the shutters successively from the frame in view position.

5. In an advertising device, a series of traveling frames, sign units carried by each frame, a pawl and ratchet mechanism for giving a step by step movement to the frames to successively bring them into view position, cams for regulating the actions of said pawls, trackways in advance of the frames and in front of and below view position of the frames, shutters adapted to move in said trackways, lips carried by the shutters, means carried by the frames for engaging said lips and lifting the shutters as the frames move into view position, a continuously driven roller, spirally arranged pins carried by the roller, common means for driving the roller and cams, the roller pins successively engaging the frame means for lifting the shutters, and successively releasing said shutters, thereby permitting them to drop down the trackways and uncover the said sign units.

In testimony whereof we affix our signatures.

WALTER W. JONES.
LOUIS KLEIN.